US012759843B2

(12) United States Patent
Niu et al.

(10) Patent No.: US 12,759,843 B2
(45) Date of Patent: Oct. 13, 2026

(54) METHOD FOR ONLINE REPLACEMENT AND METHOD FOR INSTALLATION OF ELEVATOR SHEAVE LINER, AND ELEVATOR SHEAVE LINER

(71) Applicant: Otis Elevator Company, Farmington, CT (US)

(72) Inventors: Yanchao Niu, Tianjin (CN); Ruguang Liu, Tianjin (CN); Xuewei Wang, Tianjin (CN); Guochen Gao, Tianjin (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/761,908

(22) Filed: Jul. 2, 2024

(65) Prior Publication Data

US 2025/0011132 A1 Jan. 9, 2025

(30) Foreign Application Priority Data

Jul. 6, 2023 (CN) ........................ 202310826269.4

(51) Int. Cl.
*B66B 11/08* (2006.01)
*B66B 5/00* (2006.01)

(52) U.S. Cl.
CPC ............ *B66B 11/08* (2013.01); *B66B 5/0087* (2013.01)

(58) Field of Classification Search
CPC ........ B66B 11/08; B66B 5/0087; B66B 15/04
See application file for complete search history.

(56) References Cited

U.S. PATENT DOCUMENTS 469,512 A * 2/1892 Buswell .................. F16H 55/50 474/176
1,469,828 A * 10/1923 Smith ..................... F16H 55/34 476/72
1,887,279 A * 11/1932 Bendit .................... F16H 55/46 474/170

(Continued)

FOREIGN PATENT DOCUMENTS

CN 204755738 U 11/2015
CN 209275929 U 8/2019

(Continued)

OTHER PUBLICATIONS

European Search Report for Application No. 24185788.7, Issued Nov. 15, 2024, 9 Pages.

*Primary Examiner* — Michael A Riegelman
(74) *Attorney, Agent, or Firm* — CANTOR COLBURN LLP

(57) ABSTRACT

A method for online replacement and a method for installation of an elevator sheave liner, and an elevator sheave liner. The method for online replacement of an elevator sheave liner includes rotating an elevator sheave provided with a liner including a plurality of assemblable sections such that at least one section to be replaced in the liner is rotated to an operating area, wherein the section to be replaced is not engaged with an elevator rope provided on the elevator sheave when in the operating area; detaching the section to be replaced from the elevator sheave, and installing a replacement section for replacing the section to be replaced onto the elevator sheave; and repeating steps until all or part of sections to be replaced in the liner are replaced.

7 Claims, 6 Drawing Sheets

(56) References Cited

U.S. PATENT DOCUMENTS

| | | | | |
|---|---|---|---|---|
| 4,284,409 | A * | 8/1981 | Van Teslaar | F16H 55/38 474/188 |
| 4,439,173 | A * | 3/1984 | Fokos | F16H 55/38 474/191 |
| 4,571,225 | A * | 2/1986 | Lengenfelder, Jr. | F16H 55/50 474/176 |
| 6,635,000 | B2 * | 10/2003 | Meindl | B61B 12/02 492/47 |
| 7,662,058 | B2 * | 2/2010 | Marten-Perolino | B61B 12/10 474/166 |
| 8,132,789 | B2 * | 3/2012 | Graebner | B66B 15/04 254/374 |
| 9,181,069 | B2 * | 11/2015 | I-Te | B66D 3/04 |
| 9,951,954 | B2 * | 4/2018 | Benson | F02K 3/00 |
| 10,766,746 | B2 * | 9/2020 | Hubbard | B66B 15/04 |
| 10,974,930 | B2 * | 4/2021 | Liu | B66B 11/08 |
| 11,117,787 | B2 * | 9/2021 | Martin | F16H 55/50 |
| 2003/0040386 | A1 * | 2/2003 | Yamasaki | B66B 15/04 474/151 |
| 2011/0108785 | A1 * | 5/2011 | Graebner | B66B 15/04 254/266 |
| 2020/0262684 | A1 * | 8/2020 | Liu | B66B 11/08 |
| 2021/0024331 | A1 * | 1/2021 | Martin | B66B 15/02 |
| 2024/0359950 | A1 * | 10/2024 | Sawatani | B66B 15/02 |
| 2025/0011132 | A1 * | 1/2025 | Niu | B66B 5/0087 |

FOREIGN PATENT DOCUMENTS

| | | | |
|---|---|---|---|
| CN | 216661438 | U | 6/2022 |
| CN | 116040440 | A | 5/2023 |
| EP | 3103755 | A1 | 12/2016 |
| JP | S56150653 | A | 11/1981 |
| WO | 2023012865 | A1 | 2/2023 |

* cited by examiner

METHOD FOR ONLINE REPLACEMENT AND METHOD FOR INSTALLATION OF ELEVATOR SHEAVE LINER, AND ELEVATOR SHEAVE LINER

FOREIGN PRIORITY

This application claims priority to Chinese Patent Application No. 202310826269.4, filed Jul. 6, 2023, and all the benefits accruing therefrom under 35 U.S.C. § 119, the contents of which in its entirety are herein incorporated by reference.

TECHNICAL FIELD OF INVENTION

The present disclosure relates to the technical field of elevators, in particular to a method for online replacement and a method for installation of an elevator sheave liner, and an elevator sheave liner.

BACKGROUND OF THE INVENTION

In elevator systems, power devices such as traction machines are usually configured to provide power for system operation. When an elevator sheave, such as a traction sheave, is driven by power to rotate, it will transmit power to the elevator rope provided on it, causing the latter to start moving, thereby driving the elevator car and/or counterweight connected with the elevator rope to move up and down along the elevator hoistway.

Most elevator sheaves are configured with liners, which generally adopt an integral structure and can be installed on elevator sheaves in various ways. For example, FIG. 1 specifically illustrates the local structure of an existing product, in which the liner 1*b* can be sleeved on the elevator sheave 1*a* through hot pressing operation, and they can also be further fixed together using the connecting component 1*c*, such as bolts. Upon research, it has been found in the present application that elevator sheave liners in the prior art need further improvements in terms of structural configuration, installation, maintenance operations, performance, and cost control.

SUMMARY OF THE INVENTION

In view of the foregoing, the present disclosure provides a method for online replacement and a method for installation of an elevator sheave liner, and an elevator sheave liner, so as to solve or at least alleviate one or more of the aforementioned problems and other problems in the prior art.

Firstly, according to one aspect of the present disclosure, a method for online replacement of an elevator sheave liner is provided, which comprises steps of: A. rotating an elevator sheave provided with a liner comprising a plurality of assemblable sections such that at least one section to be replaced in the liner is rotated to an operating area, wherein the section to be replaced is not engaged with an elevator rope provided on the elevator sheave when in the operating area; B. detaching the section to be replaced from the elevator sheave, and installing a replacement section for replacing the section to be replaced onto the elevator sheave; and C. repeating steps A and B until all or part of sections to be replaced in the liner are replaced.

In the method for online replacement of an elevator sheave liner according to the disclosure, optionally, the section to be replaced is installed in a groove arranged circumferentially on the elevator sheave and has an extending portion extending radially outward beyond the groove, and in step B the section to be replaced is detached from the groove for being disassembled from the elevator sheave by applying a force to the extending portion.

In the method for online replacement of an elevator sheave liner according to the disclosure, optionally, in step B the replacement section is installed in a groove arranged circumferentially on the elevator sheave, a first end of the replacement section abuts against one end of the groove and a second end of the replacement section that is opposite to the first end abuts against the other end of the groove, and the first end and the second end are respectively subjected to a first force being parallel to a radial direction of the elevator sheave and a second force forming an angle with the radial direction of the elevator sheave after the replacement section is installed in place.

In the method for online replacement of an elevator sheave liner according to the disclosure, optionally, the following steps are also included: before step A or step B, detaching a fastening component from the liner, wherein the fastening component is configured to provide a force along a radial direction of the elevator sheave to fasten the liner in place on the elevator sheave; and after step C, installing the fastening component onto the liner after section replacement to fasten the liner in place on the elevator sheave.

In the method for online replacement of an elevator sheave liner according to the disclosure, optionally, the fastening component is installed in assembly portions of the liner that are arranged at the top of the plurality of assemblable sections along a circumferential direction of the liner.

In the method for online replacement of an elevator sheave liner according to the disclosure, optionally, the assembly portions are constructed in the shape of a groove, and the fastening component includes a metal strip.

In the method for online replacement of an elevator sheave liner according to the disclosure, optionally, the operating area is located at a lower portion of the elevator sheave, and/or a joint seam between two adjacent sections of the liner is constructed in the shape of a step, an arc, or an oblique line with an angle of less than 90° and not less than 10° formed between the oblique line and a longitudinal section of the elevator sheave.

Secondly, according to another aspect of the present disclosure, the present disclosure also provides a method for installation of an elevator sheave liner, which comprises steps of: providing an elevator sheave and a liner comprising a plurality of assemblable sections; and installing the plurality of assemblable sections along a circumferential direction of the elevator sheave onto the elevator sheave to form a liner located on the elevator sheave after they are assembled, wherein at least one section thereof is configured to be not engaged with an elevator rope provided on the elevator sheave when the section is located in an operating area after the elevator sheave is rotated.

In the method for installation of an elevator sheave liner according to the disclosure, optionally, the section is installed in a groove arranged circumferentially on the elevator sheave and has an extending portion extending outward beyond the groove along a radial direction of the elevator sheave, and the section is detached from the groove for being disassembled from the elevator sheave by applying a force to the extending portion.

In the method for installation of an elevator sheave liner according to the disclosure, optionally, a first end of the section abuts against one end of the groove that is arranged circumferentially on the elevator sheave and a second end of the section that is opposite to the first end abuts against the other end of the groove, and the first end and the second end are respectively subjected to a first force being parallel to a radial direction of the elevator sheave and a second force forming an angle with the radial direction of the elevator sheave after the section is installed in place.

In the method for installation of an elevator sheave liner according to the disclosure, optionally, a step is also included: after installing the plurality of assemblable sections in a groove arranged circumferentially on the elevator sheave, installing a fastening component on the liner formed after assembly to provide a force along a radial direction of the elevator sheave to fasten the liner in place on the elevator sheave.

In the method for installation of an elevator sheave liner according to the disclosure, optionally, the fastening component is installed in assembly portions of the liner that are arranged at the top of the plurality of assemblable sections along a circumferential direction of the liner.

In the method for installation of an elevator sheave liner according to the disclosure, optionally, the assembly portions are constructed in the shape of a groove, and the fastening component includes a metal strip.

In the method for installation of an elevator sheave liner according to the disclosure, optionally, the operating area is located at a lower portion of the elevator sheave, and/or a joint seam between two adjacent sections of the liner is constructed in the shape of a step, an arc, or an oblique line with an angle of less than 90° and not less than 10° formed between the oblique line and a longitudinal section of the elevator sheave.

In addition, according to another aspect of the present disclosure, an elevator sheave liner is provided. The elevator sheave liner comprises a plurality of assemblable sections, wherein the plurality of assemblable sections are configured to be assembled onto the elevator sheave to form a liner for the elevator sheave, and at least one section thereof is configured to be not engaged with an elevator rope provided on the elevator sheave when the section is located in an operating area after the elevator sheave is rotated.

In the elevator sheave liner according to the disclosure, optionally, the section is configured to be installed in a groove arranged circumferentially on the elevator sheave and have an extending portion extending outward beyond the groove along a radial direction of the elevator sheave, and the section is detachable from the groove for being disassembled from the elevator sheave by applying a force to the extending portion.

In the elevator sheave liner according to the disclosure, optionally, the section is configured to be installed in a groove arranged circumferentially on the elevator sheave and have a first end and a second end opposite to each other, the first end is configured to abut against one end of the groove during installation and the second end is configured to abut against the other end of the groove during installation, and the first end and the second end are respectively subjected to a first force being parallel to a radial direction of the elevator sheave and a second force forming an angle with the radial direction of the elevator sheave after the section is installed in place.

In the elevator sheave liner according to the disclosure, optionally, the plurality of assemblable sections are provided with assembly portions for fastening the elevator sheave liner after assembly in place onto the elevator sheave by installing a fastening component in the assembly portions to provide a force along a radial direction of the elevator sheave.

In the elevator sheave liner according to the disclosure, optionally, the assembly portions are arranged at the top of the plurality of assemblable sections along a circumferential direction of the liner and constructed in the shape of a groove, and the fastening component includes a metal strip.

In the elevator sheave liner according to the disclosure, optionally, the operating area is located at a lower portion of the elevator sheave, and/or a joint seam between two adjacent sections of the elevator sheave liner is constructed in the shape of a step, an arc, or an oblique line with an angle of less than 90° and not less than 10° formed between the oblique line and a longitudinal section of the elevator sheave.

The solutions of the present disclosure can effectively improve the structures and installation operations of elevator sheave liners. In particular, it can achieve online replacement of an elevator sheave liner, making the installation and maintenance processes more simple, efficient, and time-saving. Compared with the prior art, the application of the present disclosure can save up to 90% of the assembly time for an elevator sheave liner, significantly reducing the workload of on-site personnel and promoting cost reduction.

BRIEF DESCRIPTION OF THE DRAWINGS

The technical solutions of the present disclosure will be described in further detail below with reference to the accompanying drawings and embodiments. However, it should be understood that these drawings are designed merely for the purpose of explanation and only intended to conceptually illustrate the structures and configurations described herein, and are not required to be drawn to scale.

DETAILED DESCRIPTION OF THE INVENTION

Firstly, it should be noted that the steps, structure, characteristics, advantages, etc. of a method for online replacement and a method for installation of an elevator sheave liner, and an elevator sheave liner according to the disclosure will be described below by way of examples. However, neither of the descriptions should be understood as limiting the present disclosure in any way. In the text, the technical terms "first", "second", etc. are only used for the purpose of distinguishing and are not intended to indicate the order and relative importance thereof. The technical term "connection" includes connections in a direct or indirect manner.

In addition, for any single technical feature described or implied in the embodiments mentioned herein, or any single technical feature shown or implied in individual drawings, the present disclosure still allows for any combination or deletion of these technical features (or equivalents thereof) without any technical obstacle. Therefore, it should be considered that these more embodiments according to the disclosure are also within the scope of the present disclosure. For the sake of simplification, identical or similar components and features may only be indicated in one or several places in the same drawing.

Figure 1:
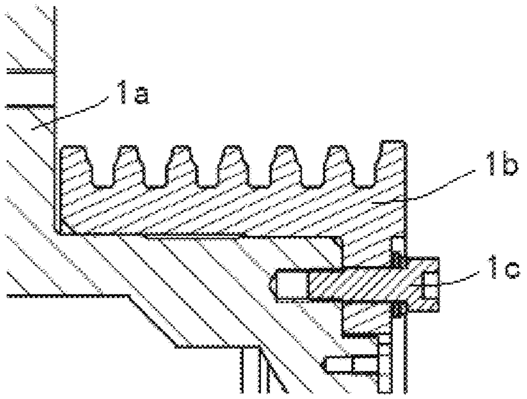
FIG. 1 is a local side-section structural schematic diagram of an existing elevator sheave installed with a liner.
Figure 2:
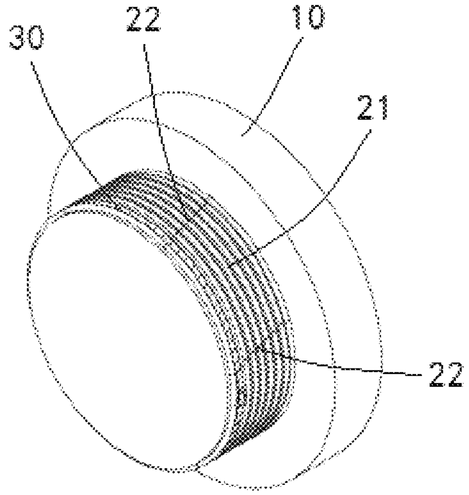
FIG. 2 is a three-dimensional structural schematic diagram of an example of an elevator sheave installed with an embodiment of an elevator sheave liner according to the disclosure.
Figure 3:
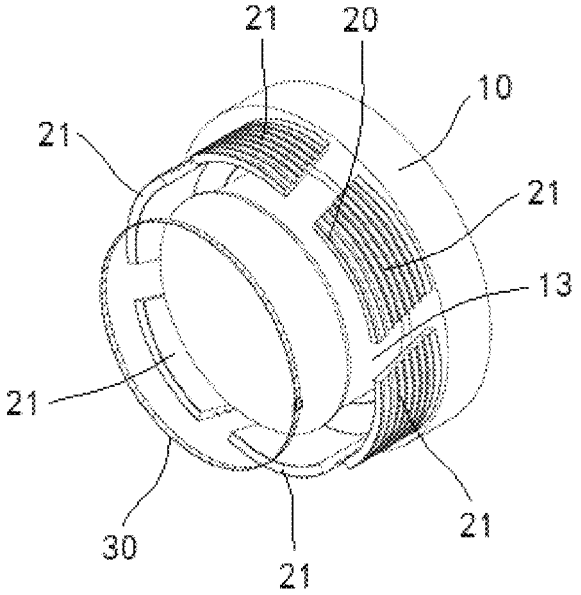
FIG. 3 is an exploded structural schematic diagram of the example in FIG. 2.
Figure 4:
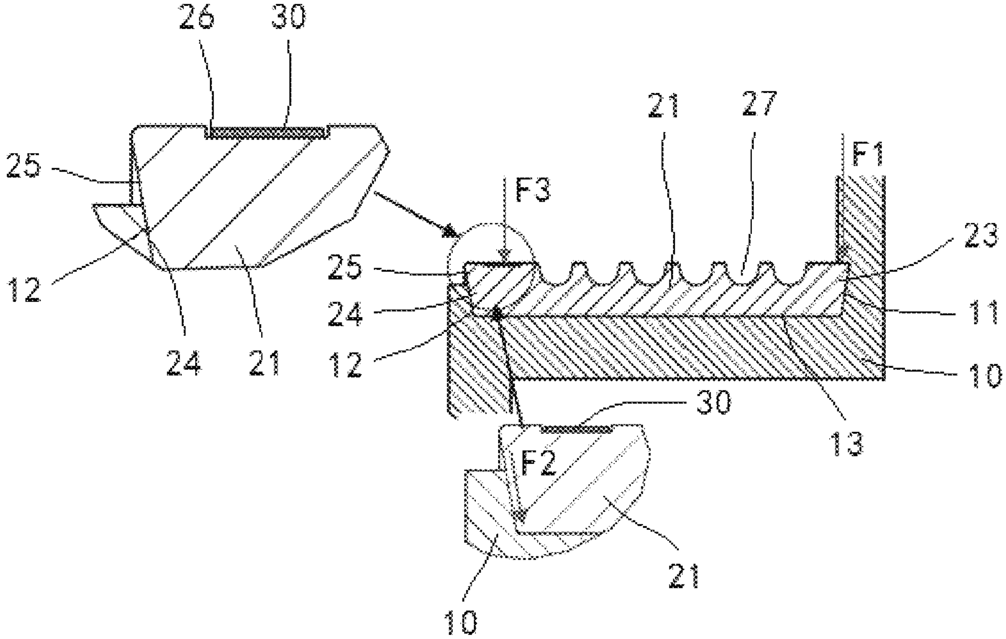
FIG. 4 shows a local side-section structural schematic diagram after a liner section in the example of FIG. 2 is installed into the groove of the example of the elevator sheave.

Referring to FIGS. 2 to 4, an embodiment of an elevator sheave liner according to the disclosure is illustrated in an exemplary manner through these accompanying drawings. In this embodiment, a liner 20 is configured to include a plurality of sections 21, which can be assembled and arranged on an elevator sheave 10 as shown in FIGS. 2 and 3, for example, installed in grooves 13 arranged along the circumferential direction of the elevator sheave 10, thereby forming a liner for the elevator sheave after the plurality of sections are assembled. When arranging an elevator rope 40 around the liner, the liner can play a positive role in reducing sheave wear, reducing vibration and noise, preventing corrosion, facilitating equipment maintenance, and the like, during use.

Generally speaking, the elevator sheave 10 can be made of any suitable material such as cast iron, steel, etc. as needed, and the liner 20 can be made of any suitable material such as soft metal, rubber, nylon, non-metallic polymer, etc. as needed. For the elevator rope 40, which is often referred to as elevator steel cable, elevator belt, steel belt, or lifting belt in some applications, it can be optionally configured with a plurality of strands of ropes according to the specific application situation. When the elevator rope 40 is provided on the elevator sheave 10 and the liner 20, each strand of rope can be placed, for example, in the corresponding recess 27 provided on the section 21, which is conducive to forming stable positioning to improve operation stability and safety reliability.

Figure 5A:
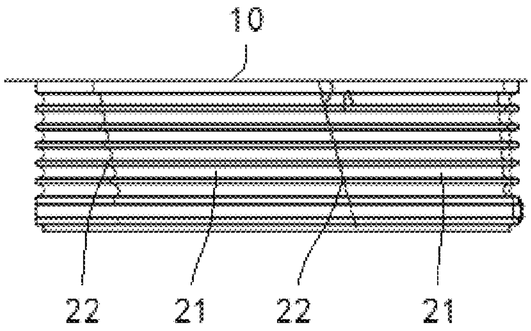
FIGS. 5A, 5B, 5C and 5D show the respective top structural schematic views of four different embodiments of the elevator sheave liner according to the disclosure being installed on the elevator sheave, respectively.
Figure 5B:
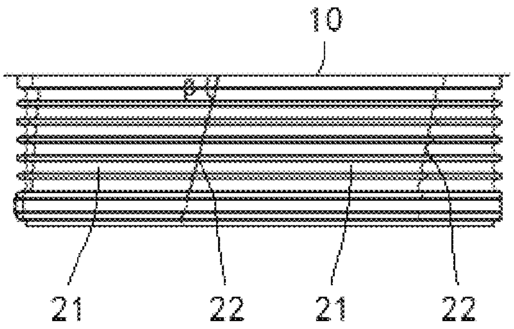
Figure 5C:
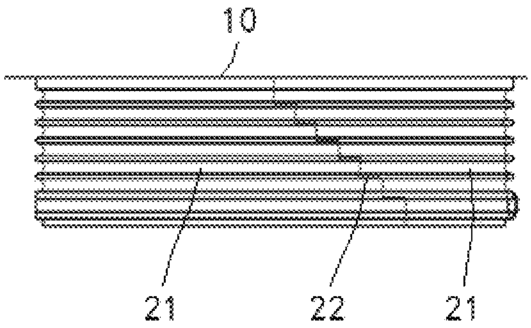
Figure 5D:
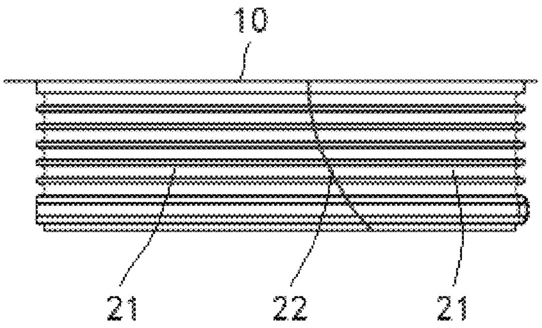

In the embodiment shown in FIGS. 2 and 3, it is only exemplarily shown that the liner 20 is configured with six sections 21 in total. It should be noted that these sections may have the same or different structural configurations in terms of circumference length, edge contour, material, and color selection. For example, a joint seam 22 between two adjacent sections 21 of the liner 20 after they are assembled can be constructed into any suitable shape as needed. For example, in FIGS. 5A-5D, joint seam configurations such as an oblique line shape, a stepped shape, and an arc shape are illustrated, respectively. In FIGS. 5A and 5B, it is also shown that such oblique lines can have different tilt directions relative to the axis of the elevator sheave 10. For example, as an optional situation, the oblique line can be arranged to form an angle β greater than or equal to 10° and less than 90° with the longitudinal section of elevator sheave 10. In the case where the joint seam 22 between two adjacent sections 21 has a joint seam configuration that is not parallel to the axis of the elevator sheave 10, this will cause a contact time difference between the elevator rope 40 and different joint seam parts, thus effectively reducing or avoiding adverse effects such as vibration and noise that may be caused by the elevator rope 40 when contacting the joint seam 22.

It should be appreciated that the present disclosure allows for flexible configuration according to actual application requirements in terms of the specific number of sections for the liner 20, the configurations of the respective sections, and the matching configurations between the respective sections, without any limitations.

With continued reference to FIG. 4, the general situation of installing and arranging a section 21 of the liner 20 into a groove 13 of the elevator sheave 10 is described in detail in the figure. The section 21 has a first end 23 and a second end 24 opposite to each other, which are operable during installation such that the first end 23 of the section 21 first abuts against an end 11 of the groove 13, and then the second end 24 of the section 21 abuts against the other end 12 of the groove 13, thereby installing the section 21 in place in the groove 13. In this way, after installation, the first end 23 and the second end 24 of the section 21 are respectively subjected to a force F1 and a force F2 applied to them by the elevator sheave 10. The force F1 is parallel to the radial direction of the elevator sheave 10, which helps to secure the first end 23 at the current position, and the force F2 forms an angle of, for example, not more than 30° or other suitable angle value, with the radial direction of the elevator sheave 10, thereby forming a wedge-shaped self-locking force to force the second end 24 to remain in the current installation position. In this way, it is very conducive to securing the section 21 in a firm and reliable manner in the expected installation position of the groove 13.

In addition, FIG. 4 illustrates, in the form of a local enlarged view, that some structural details can be selected to be used for the section 21.

For example, in one or some embodiments, an extending portion 25 may be optionally provided on the section 21, where the extending portion 25 is configured to extend outward beyond the groove 13 along the radial direction of the elevator sheave 10. By applying a force to the extending portion 25, the section 21 can be separated from the groove 13. More specifically, the second end 24 of the section 21 can first be separated from the original position located at the end 12 of the groove 13 after a force is applied thereto, and then the first end 23 can be separated from the original position located at the end 11 of the groove 13, thus making it very convenient to detach the section 21 from the groove 13 of the elevator sheave 10.

For another example, in one or some embodiments, assembly portions 26 can be optionally provided on the section 21 to install a fastening component 30 therein, and the fastening component 30 can be used to apply a force F3 to the section 21 along the radial direction of the elevator sheave 10, thereby securing the assembled and installed liner 20 more firmly in its current position, which helps the elevator system operate more smoothly and reliably. FIG. 4 shows that the assembly portions 26 can be optionally configured into a groove shape. For example, such grooves can be arranged at the top of these sections 21 along the circumferential direction of the liner 20. The fastening component 30 can be optionally in the form of a metal strip (such as a stainless steel strip). In this way, the fastening component 30 can be installed in the grooves in a very convenient and reliable manner, and a fastening force is applied to the liner 20. The specific dimensions, shape, and configuration of the aforementioned grooves and metal strips can be designed as needed. For example, the metal strips can be configured to have a width of 10-19 mm and a thickness of 0.2-0.8 mm. It should be noted that in other embodiments, the assembly portions 26 and the fastening component 30 can adopt other feasible solutions, such as constructing them respectively into matching installation holes and connecting components (such as bolts, screws, etc.).

According to the solutions of the present disclosure, when constructing these sections 21 of the elevator sheave liner, one or more sections 21 thereof can be configured so that when all sections 21 are assembled onto the elevator sheave 10, one or more sections 21 of the liner can be rotated to reach an operating area Z by rotating the elevator sheave 10. Referring to FIGS. 9A-9E, the operating area Z is generally located at the lower portion of the elevator sheave 10. Due to the fact that the section 21 located in the operating area Z is not engaged with the elevator rope 40 installed on the elevator sheave 10 at this point, the present disclosure advantageously allows for operations such as direct installation or disassembly of one or more sections 21 online in the operating area Z without the need to detach the elevator rope 40 from the elevator sheave 10, thereby greatly reducing the workload and cost in such aspects as the assembly, maintenance of the elevator sheave liner, making the operation process both time-saving and labor-saving. The specific size and position of the operating area Z are related to the specific configuration of the elevator sheave (such as the wrap angle) and the contact position of the elevator rope on the elevator sheave and the liner along the circumferential direction. By designing one, two or more sections to be assembled to form the liner accordingly, disassembly, replacement, and other operations of these sections in the operating area Z would be allowed, without interference with the elevator rope.

Figure 6:
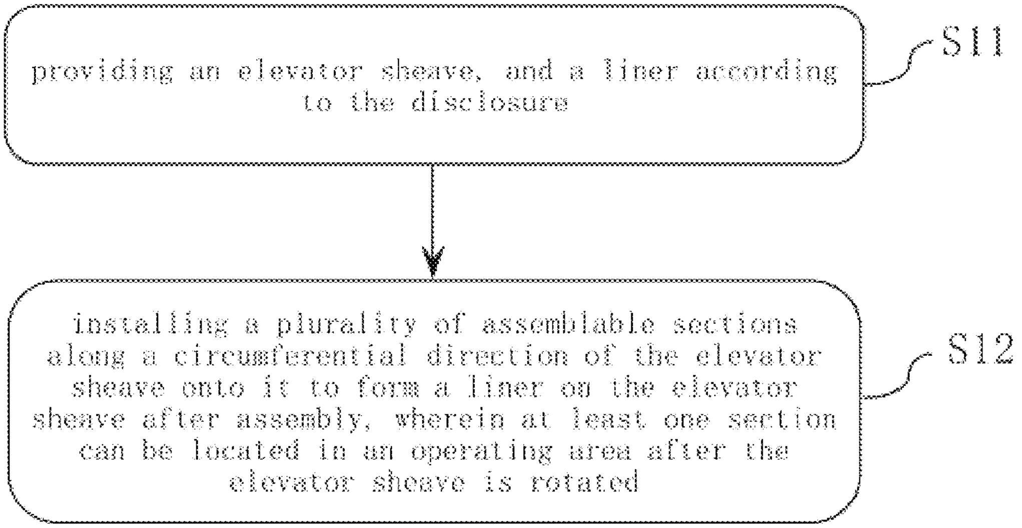
FIG. 6 is a schematic diagram of the processing flow of an embodiment of the method for installation of an elevator sheave liner according to the disclosure.

Referring to FIGS. 6 and 7A-7D, the basic situation of the method for installation of an elevator sheave liner according to the disclosure is exemplarily illustrated. FIG. 6 shows the general processing flow of an embodiment of the method for installation of an elevator sheave liner, and FIGS. 7A-7D shows the specific operation situation of the embodiment shown in FIG. 6.

As shown in FIG. 6, in the given embodiment of the method for installation of an elevator sheave liner, the following steps can be included.

First, in step S11, an elevator sheave and a liner with a plurality of assemblable sections according to the disclosure can be provided.

Figures 7A, 7B, 7C, 7D:
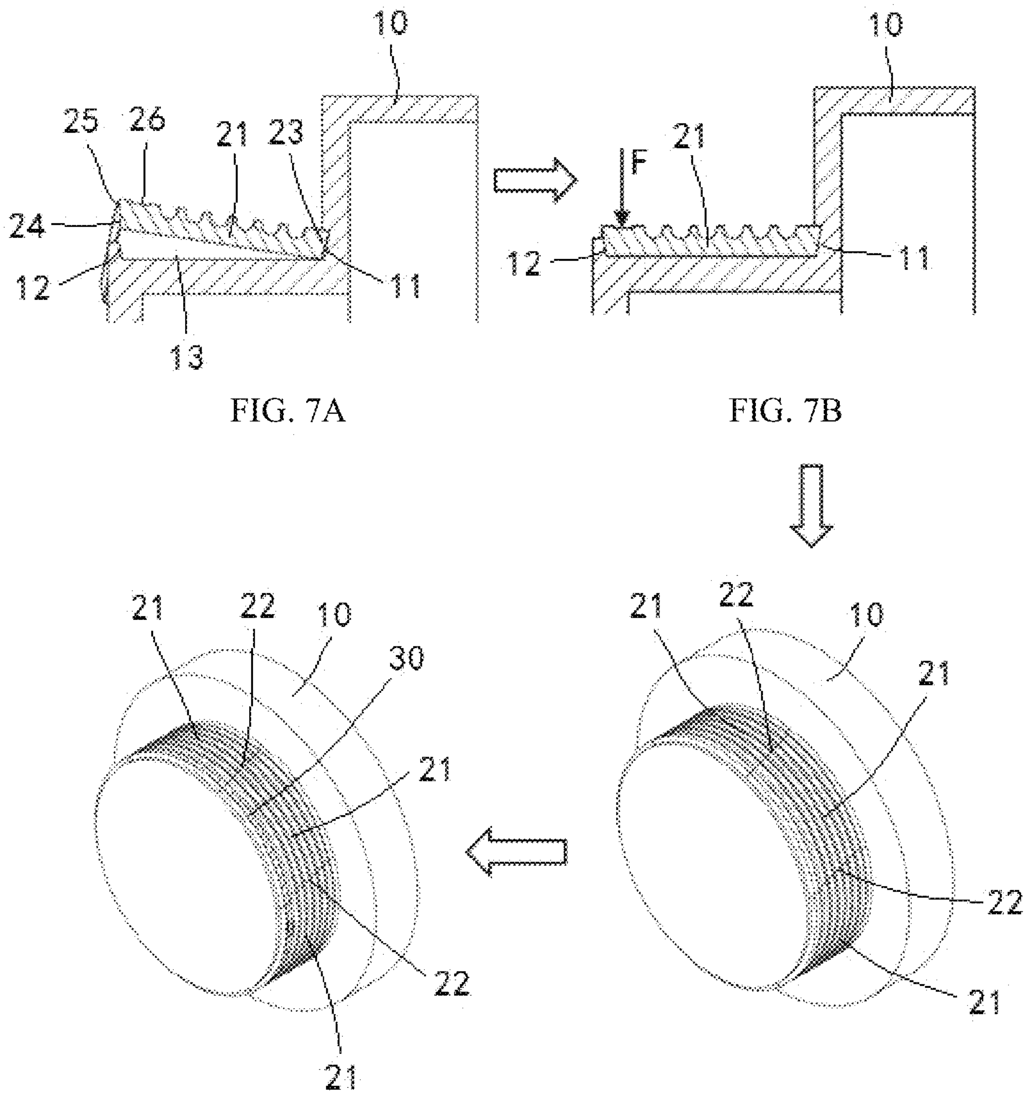
FIGS. 7A, 7B, 7C and 7D show the operation of the embodiment of the method for installation of an elevator sheave liner shown in FIG. 6.

Next, in step S12, the aforementioned sections can be installed onto the elevator sheave, for example, installed in grooves arranged along the circumferential direction of the elevator sheave. In FIGS. 7A and 7B, a specific operation example is schematically shown, i.e., how to install a section 21 into the position of the groove 13 of the elevator sheave 10, where during installation, a force F can be applied to the section 21 to facilitates its installation in place. For the specific configuration and the stress distribution after installation of the section, please refer to the previous description. After assembling these sections that make up the liner on the elevator sheave, the desired elevator sheave liner is formed. As mentioned earlier, according to the design concept of the present disclosure, one or more sections used for assembling the liner can be arranged to be placed in the operating area Z by rotating the elevator sheave. At this point, since this or these sections in the operating area Z are not engaged with the elevator rope 40 on the elevator sheave 10, any possible operation such as installation, disassembly, etc. is allowed to be carried out very conveniently on this or these sections in the operating area Z.

As an optional situation, after these sections are installed as liner assembly components in their respective positions in the grooves of the elevator sheave to form an elevator sheave liner, which is shown in FIG. 7C, a fastening component (such as a metal strip, a connecting component, etc.) can also be optionally configured to be installed on the assembled liner, as shown in FIG. 7D. In this way, a force can be applied to the liner along the radial direction of the elevator sheave, which helps to secure the liner more firmly on the elevator sheave. This advantageously ensures that the elevator rope later to be installed on the elevator sheave and the liner can operate and move in a reliable manner, and ensures that the elevator system can operate safely.

The method for installation of an elevator sheave liner according to the disclosure can make the installation and maintenance process of the liner simple and efficient, no matter it is operated in the manufacturing plant and on the construction site, thus greatly saving both time and labor. Upon comparative testing with the commonly used technical solutions in the prior art, the application of the method for installation of an elevator sheave liner according to the disclosure can save no less than 70% of labor hours, which is very efficient, time-saving, and cost-effective. The overall advantages of the solutions of the present disclosure are very obvious.

Figure 8:
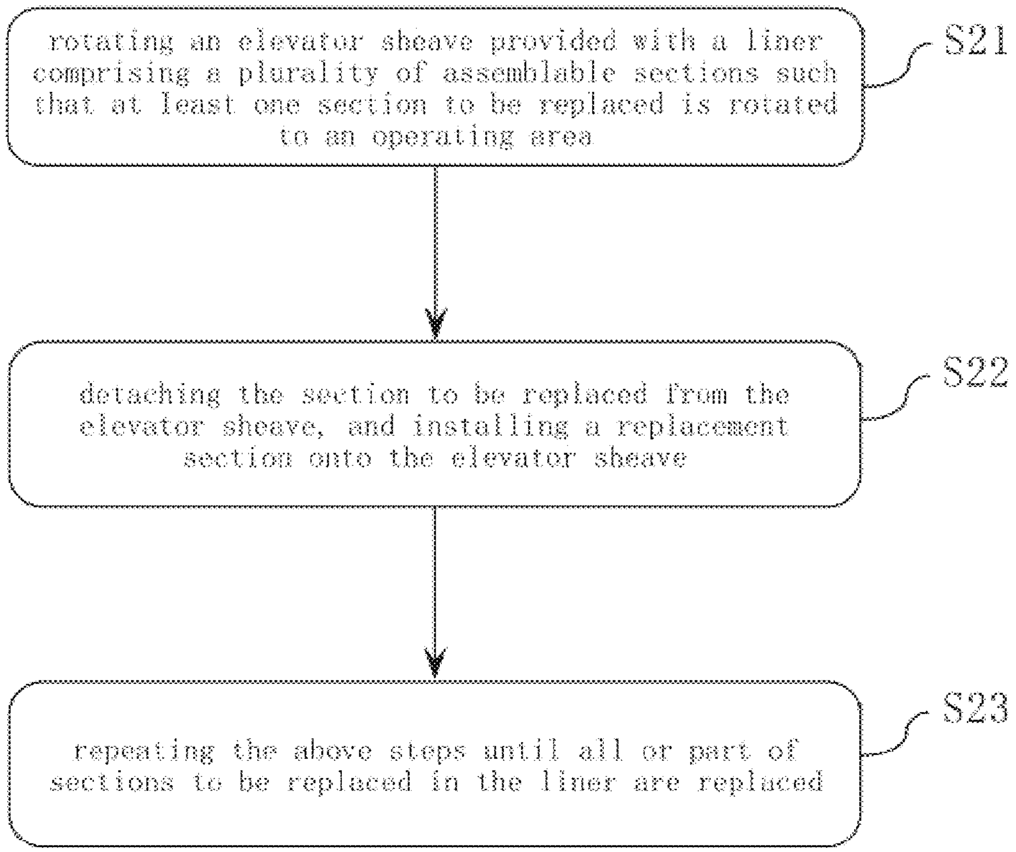
FIG. 8 is a schematic diagram of the processing flow of an embodiment of the method for replacement of an elevator sheave liner according to the disclosure.

With continued reference to FIGS. 8 and 9, FIG. 8 illustrates the general processing flow of an embodiment of the method for replacement of an elevator sheave liner according to the disclosure, and FIGS. 9A-9E illustrates the specific operation situation of the embodiment shown in FIG. 8.

As shown in FIG. 8, in the embodiment of the method for online replacement of an elevator sheave liner, the following steps can be included.

In step S21, the elevator sheave installed with the liner according to the disclosure can be rotated, for example, in the direction shown by the arrow R in FIGS. 9A-9E (or in the opposite direction), so as to place one or more sections to be replaced of the liner in the operating area Z for replacement operations. As described earlier, the liner according to the disclosure is innovatively provided with one or more sections capable of performing the aforementioned replacement operations, which are not engaged with the elevator rope provided on the elevator sheave when placed in the operating area Z, thereby allowing for replacement and installation operations of this or these sections to be replaced in the operating area Z.

In step S22, the aforementioned section to be replaced is removed from the elevator sheave, and then the replacement section used to replace it is installed onto the elevator sheave, so that the section replacement operation can be completed online, saving the tedious and laborious operations of first detaching the elevator rope from the elevator sheave and liner before performing the liner replacement operation, and then reinstalling the elevator rope onto the elevator sheave and liner after replacement, as in the prior art.

Figure 9A:
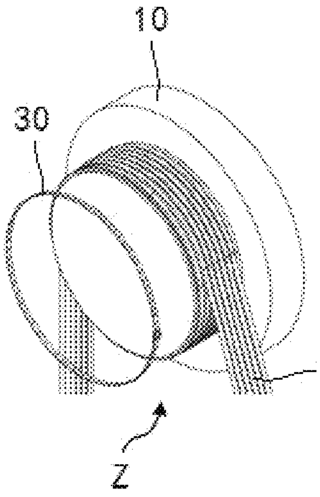
FIGS. 9A, 9B, 9C, 9D and 9E show the operation of the embodiment of the method for online replacement of an elevator sheave liner shown in FIG. 8.
Figure 9B:
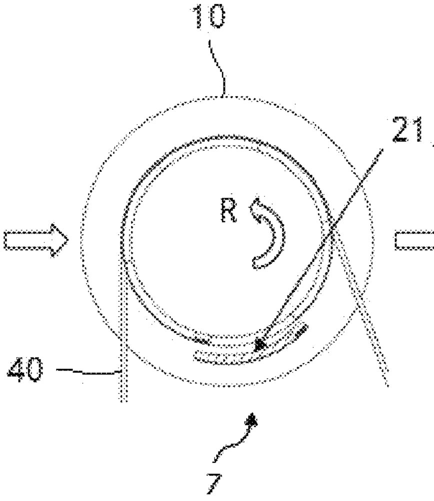
Figure 9C:
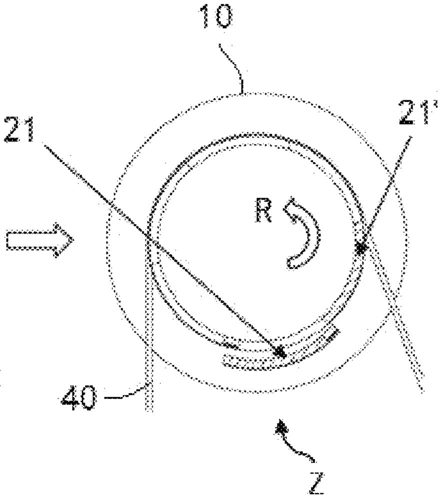
Figure 9E:
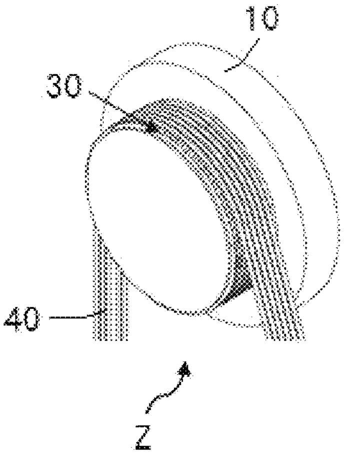
Figure 9D:
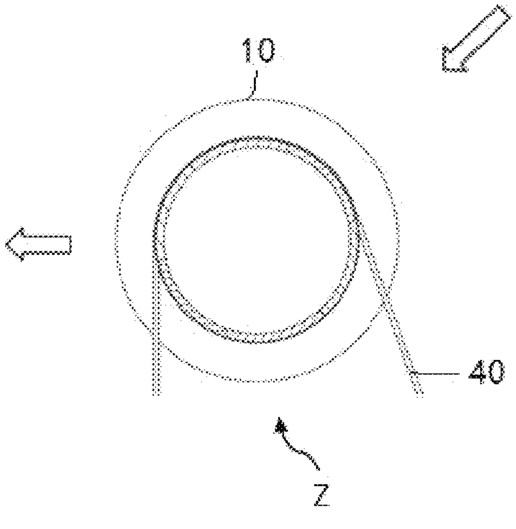

For better understanding, FIG. 9B exemplarily shows that in the operating area Z, a section 21 to be replaced is detached from the elevator sheave 10, and then a replacement section 21' to replace the detached section 21 is installed onto the elevator sheave 10, thus completing the replacement operation of the section 21 to be replaced.

In step S23, the aforementioned steps S21 and S22 are repeated. For example, FIG. 9C exemplarily shows that in the operating area Z, another section 21 to be replaced is also detached from the elevator sheave 10 for replacement, until all the sections expected to be replaced in the original liner are replaced. It should be appreciated that in some cases, only part of the sections in the liner (such as the sections with damage, cracks, and other problems) may need to be replaced, while in other cases, the entire original liner may need to be replaced. The method for online replacement of an elevator sheave liner according to the disclosure is fully applicable in this regard.

In practical applications, some optional steps can also be arranged for the method for online replacement of an elevator sheave liner according to the disclosure as required. For example, in one or some embodiments, before performing the aforementioned step S21 or S22, when the fastening component (such as a metal strip, a connecting component, etc.) discussed earlier are configured for the elevator sheave and the liner, the fastening component can be first detached from the liner. Then, after completing step S23, the above fastening component is reinstalled onto the replaced and installed liner, so as to fasten the liner in place on the elevator sheave. Regarding the above operation process, exemplary explanations are provided in FIGS. 9A and 9E, respectively.

It should also be pointed out that the method for online replacement of an elevator sheave liner according to the disclosure is particularly suitable for on-site construction operations. It saves the quite complex, time-consuming, and laborious operation of detaching the elevator rope when replacing the original elevator sheave liner as in the prior art, which greatly reduces the workload and cost investment in the replacement and installation process. According to comparative testing with commonly used technical solutions in the prior art, the application of the method for online replacement of an elevator sheave liner according to the disclosure can significantly save not less than 90% of working hours, thus bringing about outstanding effects and technical advantages.

It is readily appreciated by those skilled in the art that the technical contents such as sections of the liner, fastening component, elevator sheave, grooves that can be arranged on the elevator sheave and various forces have been described in detail previously. Therefore, those skilled in the art can directly refer to the specific descriptions and contents of the corresponding parts as mentioned above, and can select to arrange these features individually or in combination according to the application needs, so as to formulate more possible solutions for the method for installation of an elevator sheave liner and the method for online replacement of an elevator sheave liner according to the disclosure, which will not be elaborated here.

The method for online replacement and method for installation of an elevator sheave liner and the elevator sheave liner according to the disclosure have been described above in detail by way of examples only. These examples are merely used to illustrate the principles and embodiments of the present disclosure, rather than limiting the present disclosure. Various modifications and improvements can be made by those skilled in the art without departing from the scope of the present disclosure. Therefore, all equivalent technical solutions should fall within the scope of the present disclosure and be defined by the claims of the present disclosure.

What is claimed is:

1. A method for online replacement of an elevator sheave liner, the method comprising steps of:

A. rotating an elevator sheave provided with the elevator sheave liner comprising a plurality of assemblable sections such that at least one section to be replaced in the elevator sheave liner is rotated to an operating area, wherein the section to be replaced is not engaged with an elevator rope provided on the elevator sheave when in the operating area;

B. detaching the section to be replaced from the elevator sheave, and installing a replacement section for replacing the section to be replaced onto the elevator sheave; and C. repeating steps A and B until all or part of sections to be replaced in the elevator sheave liner are replaced;

wherein a joint seam between two adjacent sections of the elevator sheave liner is constructed in the shape of an oblique line with an angle of less than 90° and not less than 10° formed between the oblique line and a longitudinal section of the elevator sheave.

2. The method for online replacement of the elevator sheave liner according to claim 1, wherein the section to be replaced is installed in a groove arranged circumferentially on the elevator sheave and has an extending portion extending radially outward beyond the groove, and in step B the section to be replaced is detached from the groove for being disassembled from the elevator sheave by applying a force to the extending portion.

3. The method for online replacement of elevator sheave liner according to claim 1, wherein in step B the replacement section is installed in a groove arranged circumferentially on the elevator sheave, a first end of the replacement section abuts against one end of the groove and a second end of the replacement section that is opposite to the first end abuts against the other end of the groove, and the first end and the second end are respectively subjected to a first force being parallel to a radial direction of the elevator sheave and a second force forming an angle with the radial direction of the elevator sheave after the replacement section is installed in place.

4. The method for online replacement of the elevator sheave liner according to claim 1, further comprising steps of:

before step A or step B, detaching a fastening component from the elevator sheave liner, wherein the fastening component is configured to provide a force along a radial direction of the elevator sheave to fasten the elevator sheave liner in place on the elevator sheave; and after step C, installing the fastening component onto the elevator sheave liner after section replacement to fasten the elevator sheave liner in place on the elevator sheave.

5. The method for online replacement of the elevator sheave liner according to claim 4, wherein the fastening component is installed in assembly portions of the elevator sheave liner that are arranged at the top of the plurality of assemblable sections along a circumferential direction of the elevator sheave liner.

6. The method for online replacement of the elevator sheave liner according to claim 5, wherein the assembly portions are constructed in the shape of a groove, and the fastening component includes a metal strip.

7. The method for online replacement of the elevator sheave liner according to claim 1, wherein the operating area is located at a lower portion of the elevator sheave.

* * * * *